(12) United States Patent  
Lee

(10) Patent No.: US 9,230,427 B2  
(45) Date of Patent: Jan. 5, 2016

(54) APPARATUS FOR LOW POWER WIRELESS COMMUNICATION

(75) Inventor: Dong Wook Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 790 days.

(21) Appl. No.: 13/413,102

(22) Filed: Mar. 6, 2012

(65) Prior Publication Data

US 2012/0229261 A1 Sep. 13, 2012

(30) Foreign Application Priority Data

Mar. 9, 2011 (KR) .................. 10-2011-0020813

(51) Int. Cl.
*H04Q 5/22* (2006.01)
*G08C 17/02* (2006.01)
*H04Q 9/00* (2006.01)

(52) U.S. Cl.
CPC .................. *G08C 17/02* (2013.01); *H04Q 9/00* (2013.01); *G08C 2201/12* (2013.01); *G08C 2201/93* (2013.01); *H04Q 2209/47* (2013.01); *H04Q 2209/75* (2013.01); *H04Q 2209/883* (2013.01)

(58) Field of Classification Search
USPC .................. 340/10.1–10.6, 572.1–572.9; 235/375–385
See application file for complete search history.

(56) References Cited

U.S. PATENT DOCUMENTS

| | | | | |
|---|---|---|---|---|
| 3,898,984 | A * | 8/1975 | Mandel et al. | 600/508 |
| 4,850,018 | A * | 7/1989 | Vogt | 705/63 |
| 4,885,571 | A * | 12/1989 | Pauley et al. | 340/573.4 |
| 4,918,432 | A * | 4/1990 | Pauley et al. | 340/573.4 |
| 4,952,913 | A * | 8/1990 | Pauley et al. | 340/573.4 |
| 4,952,928 | A * | 8/1990 | Carroll et al. | 340/10.41 |
| 5,153,584 | A * | 10/1992 | Engira | 340/870.18 |
| 5,204,670 | A * | 4/1993 | Stinton | 340/10.5 |
| 5,461,385 | A * | 10/1995 | Armstrong | 342/42 |
| 5,764,138 | A * | 6/1998 | Lowe | 340/447 |
| 5,912,956 | A * | 6/1999 | Longo et al. | 379/144.07 |
| 6,025,783 | A * | 2/2000 | Steffens, Jr. | 340/644 |
| 6,690,259 | B2 * | 2/2004 | Aslanidis et al. | 340/5.61 |
| 7,002,473 | B2 * | 2/2006 | Glick et al. | 340/572.1 |
| 7,663,480 | B2 * | 2/2010 | Santoro et al. | 340/531 |
| 8,038,070 | B2 * | 10/2011 | Teraoka et al. | 235/492 |
| 8,207,820 | B2 * | 6/2012 | Bauchot et al. | 340/8.1 |
| 8,264,356 | B2 * | 9/2012 | Alexis | 340/572.4 |
| 8,648,721 | B2 * | 2/2014 | Copeland et al. | 340/571 |
| 2002/0059075 | A1 * | 5/2002 | Schick et al. | 705/1 |
| 2002/0089434 | A1 * | 7/2002 | Ghazarian | 340/988 |
| 2004/0001453 | A1 * | 1/2004 | Kawai et al. | 370/311 |
| 2004/0145520 | A1 * | 7/2004 | Richardson et al. | 342/357.07 |
| 2005/0134459 | A1 * | 6/2005 | Glick et al. | 340/572.1 |

(Continued)

*Primary Examiner* — Paul Obiniyi
(74) *Attorney, Agent, or Firm* — Jefferson IP Law, LLP

(57) ABSTRACT

A wireless communication apparatus for starting an operation according to an electric wave received from a portable terminal is provided. The apparatus includes a wireless communication module for transmitting data to the portable terminal, an RFID tag for turning-on a switch using the electric wave received from the portable terminal, the switch supplying power of a battery to a sensor, the wireless communication module and a control unit when the switch is turned-on, and for cutting-off the power supply of the battery to the sensor, the wireless communication module and the control unit when the switch is turned-off, and the control unit for driving the sensor when the power from the battery is supplied to the control unit, for controlling the wireless communication module to transmit a physical amount from the sensor to the portable terminal and for turning off the switch when the control unit receives the physical amount.

10 Claims, 8 Drawing Sheets

(56) References Cited

U.S. PATENT DOCUMENTS

| | | | |
|---|---|---|---|
| 2005/0200204 A1* | 9/2005 | Jonsson et al. | 307/10.3 |
| 2005/0212661 A1* | 9/2005 | Friedrich | 340/10.5 |
| 2005/0212693 A1* | 9/2005 | Friedrich | 342/42 |
| 2005/0270407 A1* | 12/2005 | Yamaguchi | 348/345 |
| 2006/0267731 A1* | 11/2006 | Chen | 340/10.1 |
| 2007/0132588 A1* | 6/2007 | Jung et al. | 340/572.1 |
| 2007/0285245 A1* | 12/2007 | Djuric et al. | 340/572.1 |
| 2008/0170852 A1* | 7/2008 | Santoro et al. | 398/15 |
| 2008/0261555 A1* | 10/2008 | Chen et al. | 455/404.1 |
| 2008/0307496 A1* | 12/2008 | Kurose | 726/2 |
| 2010/0066561 A1* | 3/2010 | Ulrich et al. | 340/870.07 |
| 2010/0090656 A1* | 4/2010 | Shearer et al. | 320/139 |
| 2010/0156606 A1* | 6/2010 | Gold | 340/10.4 |
| 2010/0176202 A1* | 7/2010 | Teraoka et al. | 235/492 |
| 2011/0022851 A1* | 1/2011 | Yokota et al. | 713/189 |
| 2012/0032803 A1* | 2/2012 | Copeland et al. | 340/572.1 |

\* cited by examiner

APPARATUS FOR LOW POWER WIRELESS COMMUNICATION

PRIORITY

This application claims the benefit under 35 U.S.C. §119(a) of a Korean patent application filed on Mar. 9, 2011 in the Korean Intellectual Property Office and assigned Serial No. 10-2011-0020813, the entire disclosure of which is hereby incorporated by reference.

BACKGROUND OF THE INVENTION

1. Field of the Invention

The present invention relates to a wireless communication apparatus starting operation according to an electric wave received from a portable terminal. More particularly, the present invention relates to a wireless communication apparatus capable of reducing power consumption of a battery using a Radio Frequency IDentification (RFID) tag.

2. Description of the Related Art

A body temperature measuring device, that periodically measures and transfers a human's body temperature to a portable terminal, may be used as a wireless communication apparatus. The body temperature measuring device may be mounted at a user's wrist in the form of a wrist watch. A smart phone including an application for collecting data from the body temperature measuring device may be used as the portable terminal.

It is assumed herein that the portable terminal periodically collects human body temperature data from the body temperature measuring device. The body temperature measuring device may include a sensor for measuring a human body temperature, a memory for storing human body temperature data measured by the sensor, a transmitter for transmitting data stored in the memory to the portable terminal through a wireless communication channel, a controller for controlling respective structural elements, and a battery for supplying power.

A procedure for collecting human body temperature data from a body temperature measuring device by the portable terminal is as follows. First, the portable terminal establishes wireless connection with the body temperature measuring device. Subsequently, the portable terminal transmits a command signal transmitting data to the body temperature measuring device. When the body temperature measuring device receives the command signal from the portable terminal, it transmits data stored in a memory to the portable terminal as a response thereof.

Because the body temperature measuring device may not determine when the portable terminal requests establishment of a wireless connection, it should always listen to a wireless communication channel in an idle state. As a result, the body temperature measuring device consumes power in the idle state and the duration of a battery is reduced.

SUMMARY OF THE INVENTION

Aspects of the present invention are to address at least the above-mentioned problems and/or disadvantages and to provide at least the advantages described below. Accordingly, an aspect of the present invention is to provide an apparatus for low power wireless communication that reduces power consumption for listening to a wireless communication channel in an idle state, thereby increasing the apparatus operation duration.

In accordance with an aspect of the present invention, a wireless communication apparatus for starting an operation according to an electric wave received from a portable terminal is provided. The apparatus includes a battery, a sensor for measuring a physical amount, a wireless communication module for transmitting data to the portable terminal, a Radio Frequency IDentification (RFID) tag for turning-on a switch for using the electric wave received from the portable terminal, the switch supplying power of the battery to the sensor, the wireless communication module and a control unit when the switch is turned-on, and for cutting-off the power supply of the battery to the sensor, the wireless communication module and the control unit when the switch is turned-off, and the control unit for driving the sensor when power from the battery is supplied to the control unit, for controlling the wireless communication module to transmit the physical amount received from the sensor to the portable terminal and for turning off the switch when the control unit receives the physical amount.

In accordance with another aspect of the present invention, a wireless communication apparatus for starting an operation according to an electric wave received from a portable terminal is provided. The apparatus includes a battery, a sensor for measuring a physical amount, an RFID tag for turning-on a switch using the electric wave received from the portable terminal, the switch for supplying power of the battery to the sensor and a control unit when the switch is turned-on, and for cutting-off the power supply of the battery to the sensor and the control unit when the switch is turned-off, and the control unit for driving the sensor to measure the physical amount when power from the battery is supplied to the control unit, for controlling the wireless communication module to transmit the physical amount from the sensor to the portable terminal and for turning off the switch when the control unit receives the physical amount.

In accordance with still another aspect of the present invention, a wireless communication apparatus is provided. The apparatus includes, a battery, a driver for performing a mechanical operation or an electrical operation, an RFID tag for turning-on a switch using an electric wave received from a portable terminal, the switch for supplying power of the battery to the driver and a control unit when the switch is turned-on, and for cutting-off the power supply of the battery to the driver and the control unit when the switch is turned-off, and the control unit for driving the driver when power from the battery is supplied to the control unit and for turning off the switch.

In accordance with a further aspect of the present invention, a method for starting an operation in a wireless communication apparatus according to an electric wave received from a portable terminal is provided. The method includes measuring a physical amount of a sensor, turning-on a switch, by an RFID tag, using the electric wave received from the portable terminal, supplying power of the battery to the sensor and a control unit, by the switch, when the switch is turned-on, and cutting-off the power supply of the battery to the sensor and the control unit when the switch is turned-off, driving the sensor, by a control unit, to measure the physical amount when power from the battery is supplied to the control unit, controlling the wireless communication module to transmit a physical amount from the sensor to the portable terminal, and turning off the switch when the control unit receives the physical amount.

Since the apparatus for low power wireless communication according to an exemplary embodiment of the present invention consumes no power in an idle state, a battery may be used for a long time without needing to be replaced or recharged.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
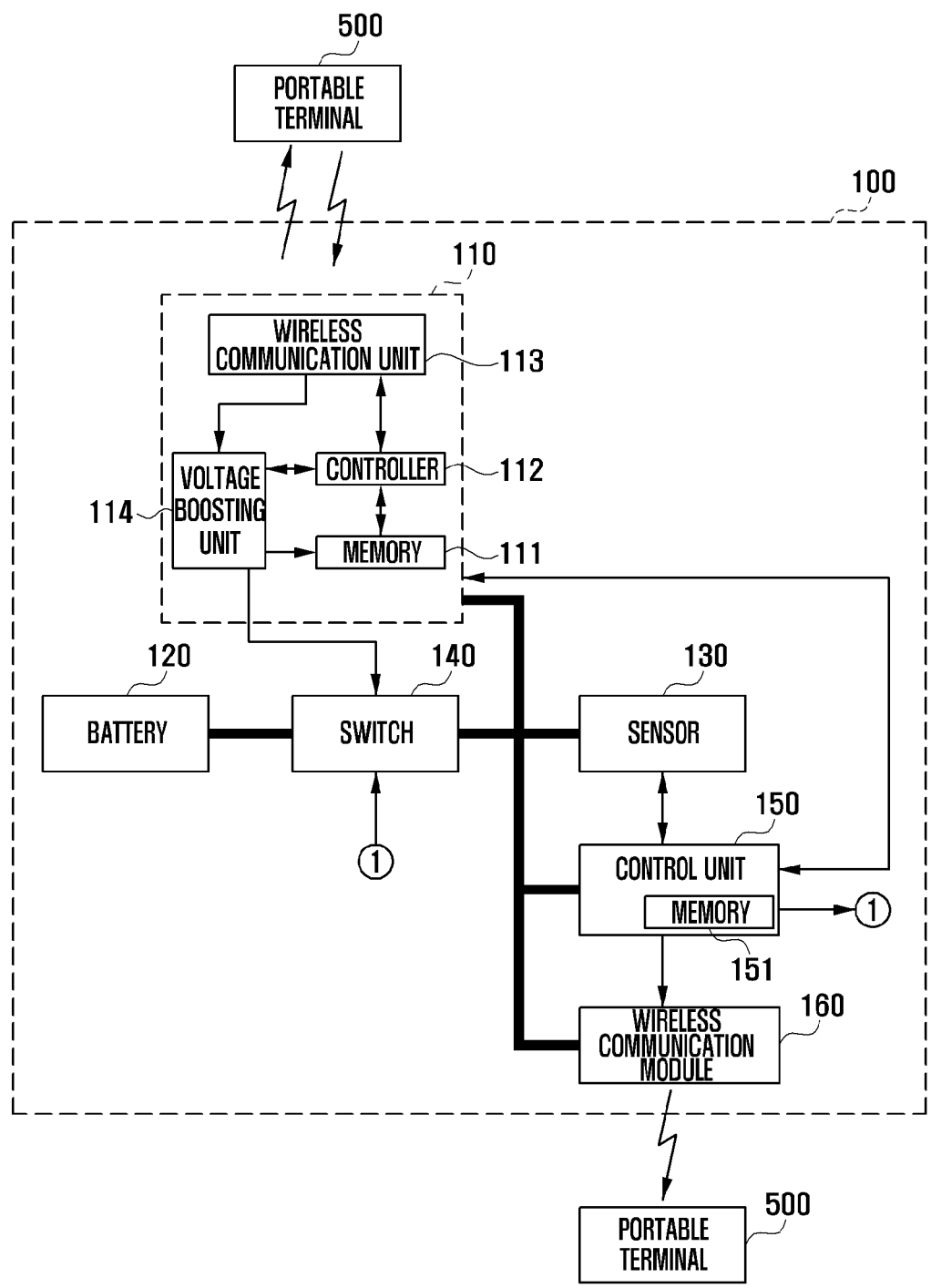
FIG. 1 is a block diagram illustrating a configuration of a wireless communication apparatus according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 8, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

As used herein, the term "portable terminal" denotes various information and communication devices such as a Personal Digital Assistant (PDA), a Tablet Personal Computer (PC), a portable phone, and a Radio Frequency IDentification (RFID) reader, and a remote controller. The PDA, the Tablet PC, the portable phone such as a smart phone may have a software and hardware configuration functioning as a Radio Frequency IDentification (RFID) reader. Further, the portable terminal may include a software and hardware configuration functioning as a remote controller.

According to exemplary embodiments of the present invention, the wireless communication channel denotes a frequency allotted for connection of a physical device or a portable terminal and a wireless communication device to exchange data between the portable terminal and the wireless communication device or a frequency width. Accordingly, the wireless communication channel may become an RFID channel, a Wireless Local Area Network (WLAN) channel, a Bluetooth channel or an Ultra-WideBand (UWB) channel.

FIG. 1 is a block diagram illustrating a configuration of a wireless communication apparatus according to an exemplary embodiment of the present invention.

Referring to FIG. 1, a wireless communication apparatus 100 according to an exemplary embodiment of the present invention may include an RFID tag 110, a battery 120, a sensor 130, a switch 140, a control unit 150, and a wireless communication module 160. Here, the switch 140 and the control unit 150 may be configured by one Integrated Circuit (IC) chip. Meanwhile, the switch 140, the control unit 150, and the wireless communication module 160 may be configured by one IC chip.

The RFID tag 110 may be a semi-active or semi-passive tag that operates according to energy received from a portable terminal 500, or operates using a battery 120. Further, the RFID 110 includes a memory 111, a controller 112, a wireless communication unit 113, and a voltage boosting unit 114.

Here, the memory 111 may be configured by a non-volatile memory, for example, an Electrically Erasable and Programmable Read-Only Memory (EEPROM).

The wireless communication unit 113 executes the following three functions. First, the wireless communication unit 113 receives an electric wave having a certain frequency from the portable terminal 500 and transfers the electric wave to the voltage boosting unit 114. Second, the wireless communication unit 113 demodulates a modulated RF signal received from the portable terminal 500 and transfers the demodulated RF signal to the controller 112. Third, the wireless communication unit 113 receives and modulates data stored in the memory 111 from the controller 112 and transmits the modulated data to the portable terminal 500.

The voltage boosting unit 114 receives, rectifies, and boosts an electric wave from the wireless communication unit 113 to generate a preset Direct Current (DC) voltage. That is, the voltage boosting unit 114 executes a function creating power for driving the controller 112, the memory 111, and the switch 140.

The controller 112 analyzes a command received from the wireless communication unit 113. Based on the analysis result, when the command is a wake up signal, the controller 112 controls the voltage boosting unit 114 to turn-on the switch 140. That is, when the controller 112 receives the wake up signal from the portable terminal 500, it turns-on power of the wireless communication apparatus 100. Further, the control unit 112 may transfer the wake up signal to the control unit 150. In the meantime, when the command is a data request signal, the controller 112 transfers data stored in the memory 111 to the wireless communication unit 113 such that the data is transmitted to the portable terminal 500.

Meanwhile, the wake up signal may include at least one command for controlling the control unit 150. The commands may be classified by patterns or frequency bands of a signal. In this case, the same number of RFID tags 110 may be configured by the corresponding number of the commands. Respective tags are activated by their commands and transmit the commands to the control unit 150.

The sensor 130 may be variously configured. For example, when the wireless communication apparatus 100 is used to measure a human body, the sensor 130 may include a plurality of sensors measuring pulse, human body temperature, blood pressure, and blood glucose level.

The switch 140 is turned-on by an RFID tag 110 and turned-off by the control unit 150. If the switch 140 is turned-on, it supplies power from a battery 120 to the RFID tag 110, the sensor 130, the control unit 150, and the wireless communication module 160. In contrast, if the switch 140 is turned-off, it cuts-off power supply of a battery 120.

If power from the battery 120 is supplied to the control unit 150, it drives the sensor 130. The control unit 150 transmits data received from the sensor 130 to the RFID tag 110. Accordingly, the RFID tag 110 stores data received from the control unit 150 in the memory 111 thereof. The control unit 150 transfers data to the RFID tag 110 and then turns-off the switch 140.

In the meantime, when the RFID tag 110 transmits data using energy of a signal received from a portable terminal 500 and not the battery 120, the capacity of the transmittable data may be limited. Furthermore, because a memory 111 has low capacity, the RFID tag 110 may not store all data received from the control unit 150. Accordingly, the control unit 150 may transmit data received from the sensor 130 to the portable terminal 500 using the wireless communication module 160 instead of the RFID tag 110.

Further, the control unit 150 may determine a storing area according to a type of command. For example, when a command received from the RFID tag 110 is a command indicating "measure and transmit a current human body temperature", the control unit 150 determines a tag memory 111 as a storing area of data. Meanwhile, when the received command is a command indicating "measure and transmit a pulse for 1 minute", the control unit 150 determines a memory 151 of the control unit 150 as the storing area of data.

Further, the control unit 150 may determine a storing area according to a capacity of data received from the sensor 130. In more detail, the control unit 150 verifies a capacity of data received from the sensor 130. As a result, when the capacity of data is equal to or larger than a set threshold value, the control unit 150 determines a memory 151 thereof as the storing area of data. In contrast, when the capacity of data is less than the set threshold value, the control unit 150 determines a tag memory 111 as the storing area of data. When the memory 151 of the control unit 150 is determined as the storing area of data, the control unit 150 stores data received from the sensor 130 in the memory 151. Subsequently, the control unit 150 controls the wireless communication module 160 to transmit data stored in the memory 151 thereof to the portable terminal 500, and then turns-off the switch 140.

The wireless communication module 160 may communicate with the portable terminal 500 using a WLAN, Bluetooth technology, or UWB technology.

Figure 2:
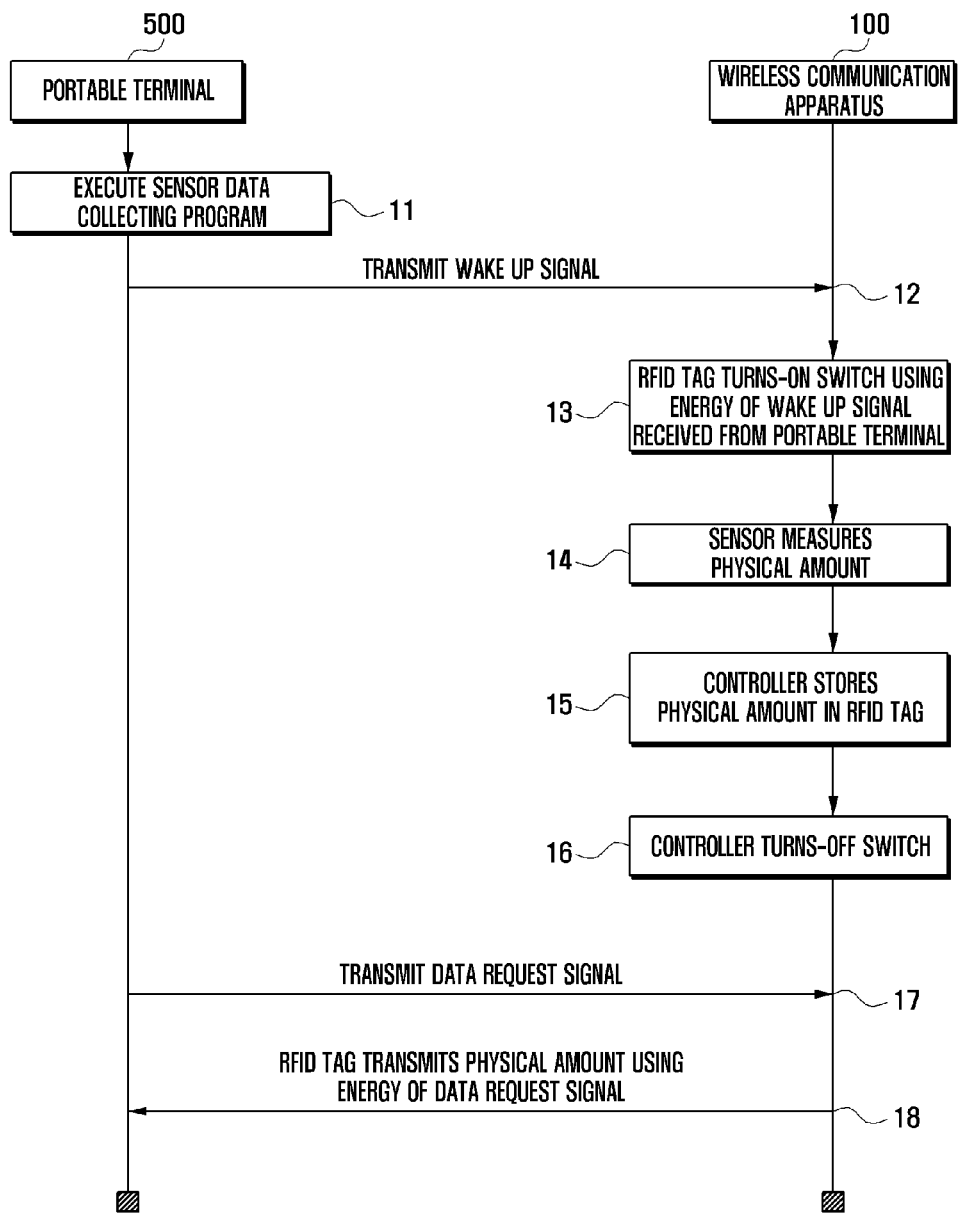
FIG. 2 is a diagram illustrating a low power driving method of a wireless communication apparatus according to an exemplary embodiment of the present invention.

FIG. 2 is a scheme diagram illustrating a low power driving method of a wireless communication apparatus according to an exemplary embodiment of the present invention.

Referring to FIG. 2, if a user pushes a certain key or touches a certain icon displayed on a touch screen for executing a sensor data collecting program, a portable terminal 500 executes the sensor data collecting program at step 11.

The portable terminal 500 transmits a wake up signal to an RFID tag 110 of a wireless communication apparatus 100 at step 12.

An RFID tag 110 turns-on a switch 140 using energy of the wake up signal received from the portable terminal 500 at step 13. When the switch 140 is turned-on, a sensor 130 measures a physical amount at step 14. A control unit 150 stores the physical amount received from the sensor 130 in a memory 111 of the RFID tag 110 at step 15. The control unit 150 turns-off the switch 140 at step 16.

The portable terminal 500 transmits a data request signal to the RFID tag 110 at step 17. Accordingly, the RFID tag 110 transmits the physical amount stored in a memory 111 thereof to the portable terminal 500 using energy of the data request signal at step 18.

Figure 3:
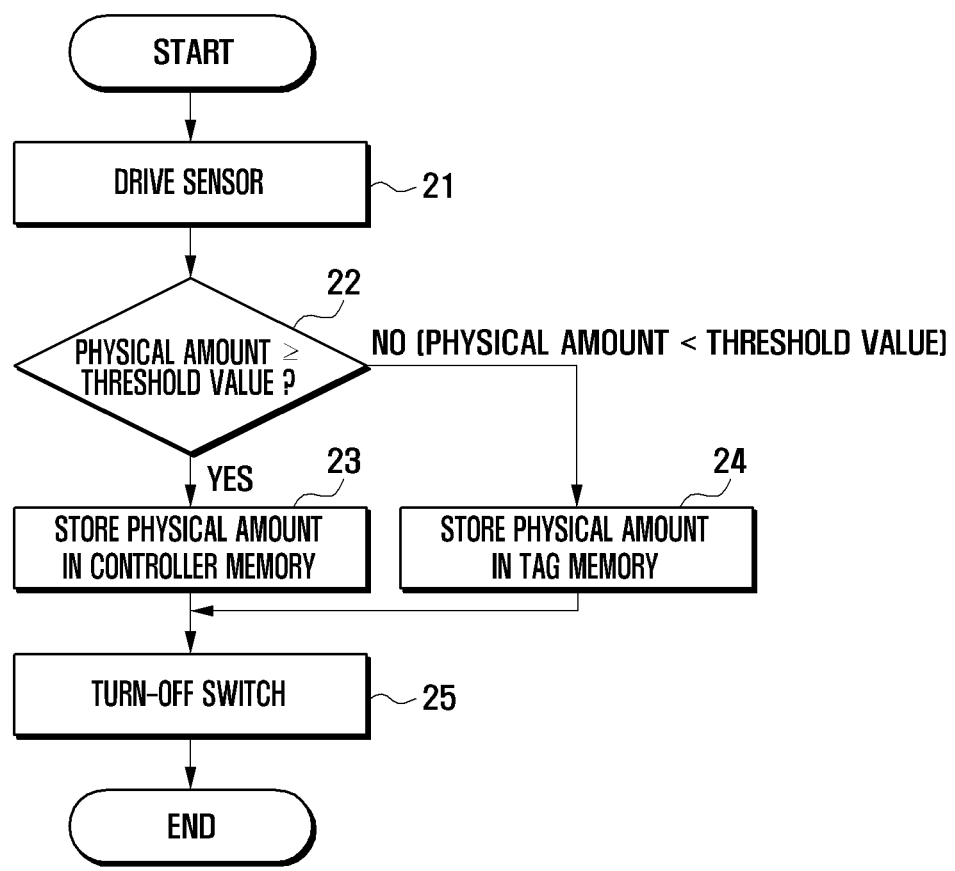
FIG. 3 is a flowchart illustrating a low power driving method of a wireless communication apparatus according to an exemplary embodiment of the present invention.

FIG. 3 is a flowchart illustrating a low power driving method of a wireless communication apparatus according to an exemplary embodiment of the present invention. It is assumed herein that an operation starts in an on state of a switch 140.

Referring to FIG. 3, the control unit 150 drives a sensor 130 to measure a physical amount at step 21. The control unit 150 verifies the size of the physical amount received from the sensor 130 at step 22. As a result, when the size of a physical amount is equal to or greater than a threshold value, the process proceeds to step 23. In contrast, when the size of a physical amount is less than the threshold value, the process proceeds to step 24. Here, step 22 may become a procedure for verifying a type of command instead of a procedure for verifying the size of a physical amount. That is, at step 22, the control unit 150 controls the sensor 130 according to a command and determines a storing area of data according to the type of the command. When a memory 151 of the control unit 150 is determined as the storing area of data, the control unit 150 proceeds to step 23. On the other hand, when a tag memory 111 is determined as the storing area of data, the control unit 150 proceeds to step 24.

The control unit 150 stores the physical amount received from the sensor 130 in a memory 151 thereof at step 23. The control unit 150 controls a wireless communication module 230 to transmit the physical amount stored in a memory 151 thereof to the portable terminal 500, and then proceeds to step 25. The control unit 150 stores the physical amount received from the sensor 130 in a tag memory 111 at step 24, and then proceeds to step 25. The control unit 150 turns-off a switch 140 at step 25.

Figure 4:
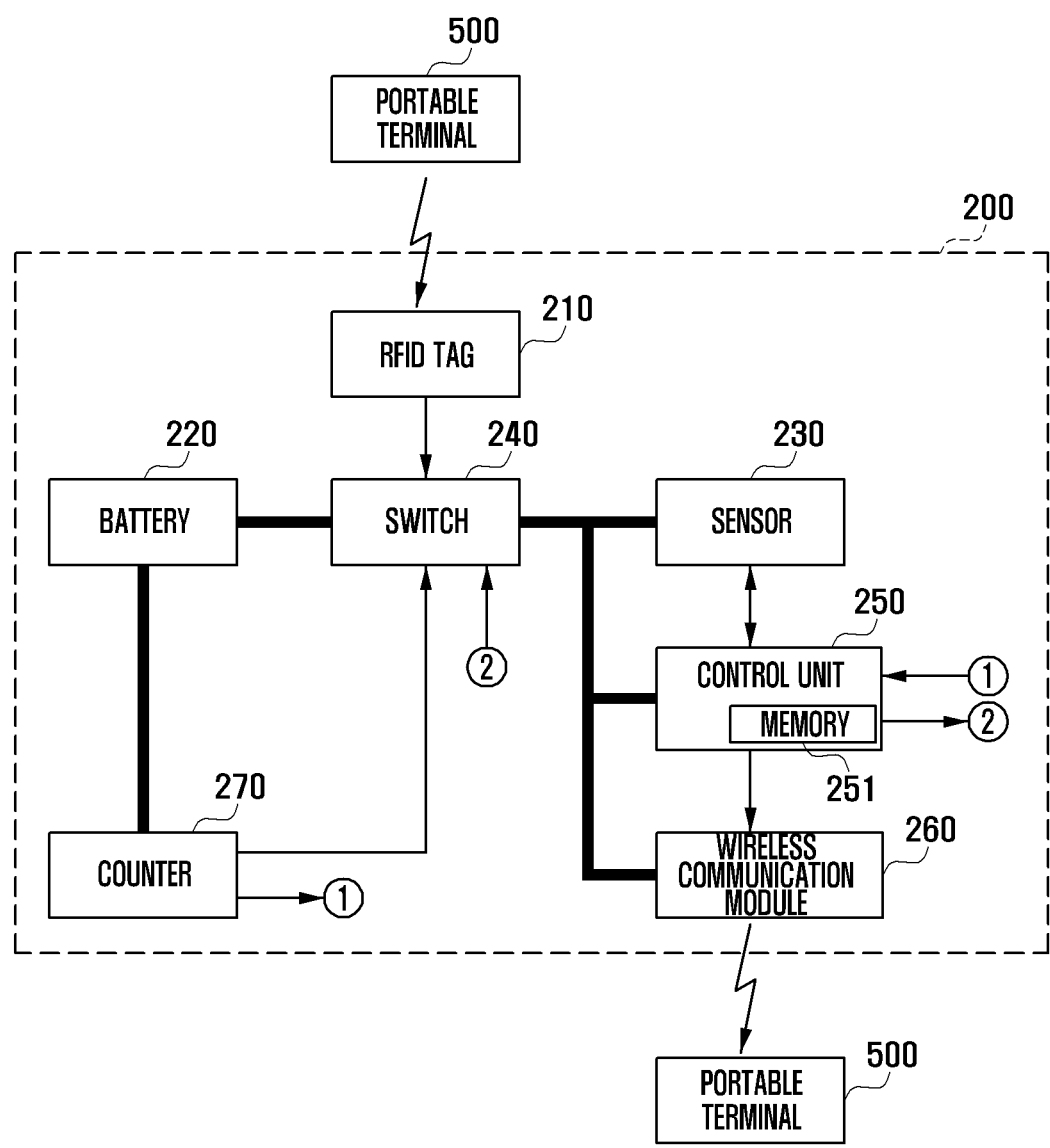
FIG. 4 is a block diagram illustrating a configuration of a wireless communication apparatus according to an exemplary embodiment of the present invention.
Figure 5:
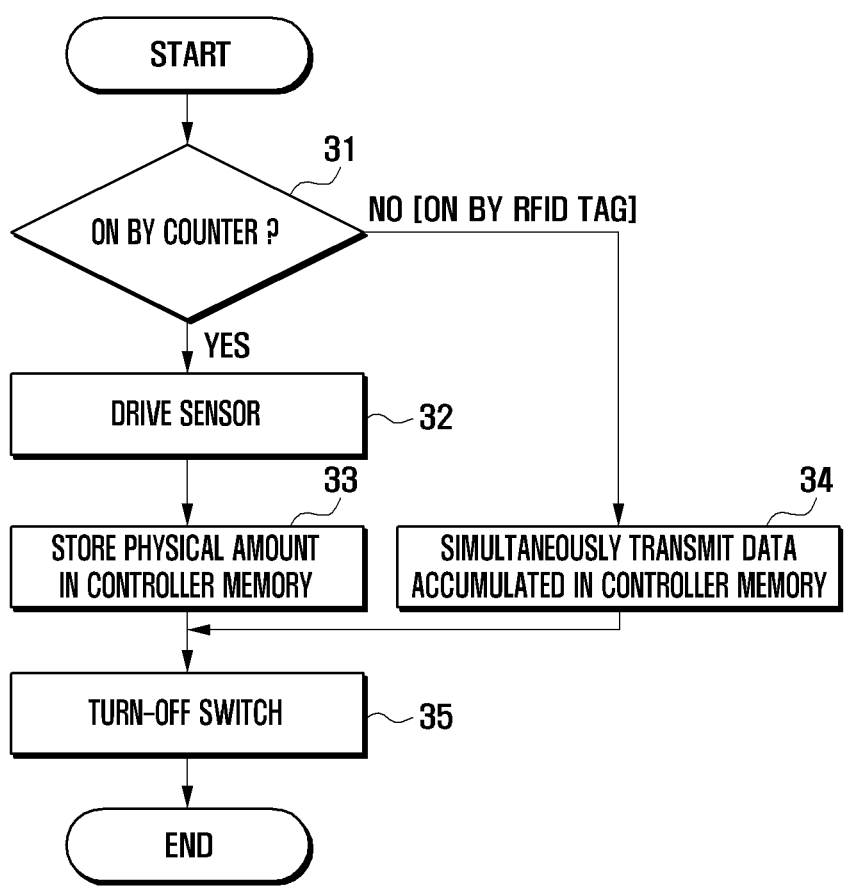
FIG. 5 is a flowchart illustrating a low power driving method of a wireless communication apparatus according to an exemplary embodiment of the present invention.

FIG. 4 is a block diagram illustrating a configuration of a wireless communication apparatus according to an exemplary embodiment of the present invention. FIG. 5 is a flowchart illustrating an example of a low power driving method of a wireless communication apparatus according to an exemplary embodiment of the present invention. The wireless communication apparatus includes a control unit 250. It is assumed herein that an operation starts in an on state of a switch 240.

Referring to FIG. 4, a wireless communication apparatus 200 according to an exemplary embodiment of the present invention includes an RFID tag 210, a battery 220, a sensor 230, a switch 240, a control unit 250, a wireless communication module 260, and a counter 270. Here, the switch 240, the control unit 250, the wireless communication module 260, and the counter 270 may be configured by one IC chip.

The RFID tag 210 may be a semi-passive tag that operates according to energy received from a portable terminal 500. Further, the RFID tag 210 turns-on a switch 240 using energy of a wake up signal received from a portable terminal 500. That is, the RFID tag 210 in FIG. 4 executes only a function of turning-on power of the wireless communication apparatus 200 unlike the RFID tag 110 described above. Meanwhile, the switch 240 may be turned-on by the counter 270.

The counter 270 outputs a wake up signal to the switch 240 at preset times to turn-on the switch 240. To output the wake up signal every preset time, the counter 270 receives power supply from a battery 220.

The sensor 230, the switch 240, and the wireless communication module 260 are identical to the sensor 130, the switch 140, and the wireless communication module 160 as described above with reference to FIG. 1 and thus a detailed description thereof is omitted.

Referring to FIG. 5, the control unit 250 determines whether the wireless communication apparatus 200 is turned-on by a counter 270 at step 31. If it is determined that the wireless communication apparatus 200 is turned-on by the counter 270, the process proceeds to step 32. In the meantime, if it is determined that the wireless communication apparatus 200 is turned-on by an RFID tag 210, the process proceeds to step 34.

The control unit 250 drives the sensor 230 to measure a physical amount at step 32. Next, the control unit 250 stores the physical amount received from the sensor 230 in a memory 251 thereof at step 33, and then proceeds to step 35. The control unit 250 controls a wireless communication module 260 to simultaneously transmit data accumulated in the memory 251 to the portable terminal 500 at step 34, and then proceeds to step 35. The control unit 250 turns-off the switch 240 at step 35.

Figure 6:
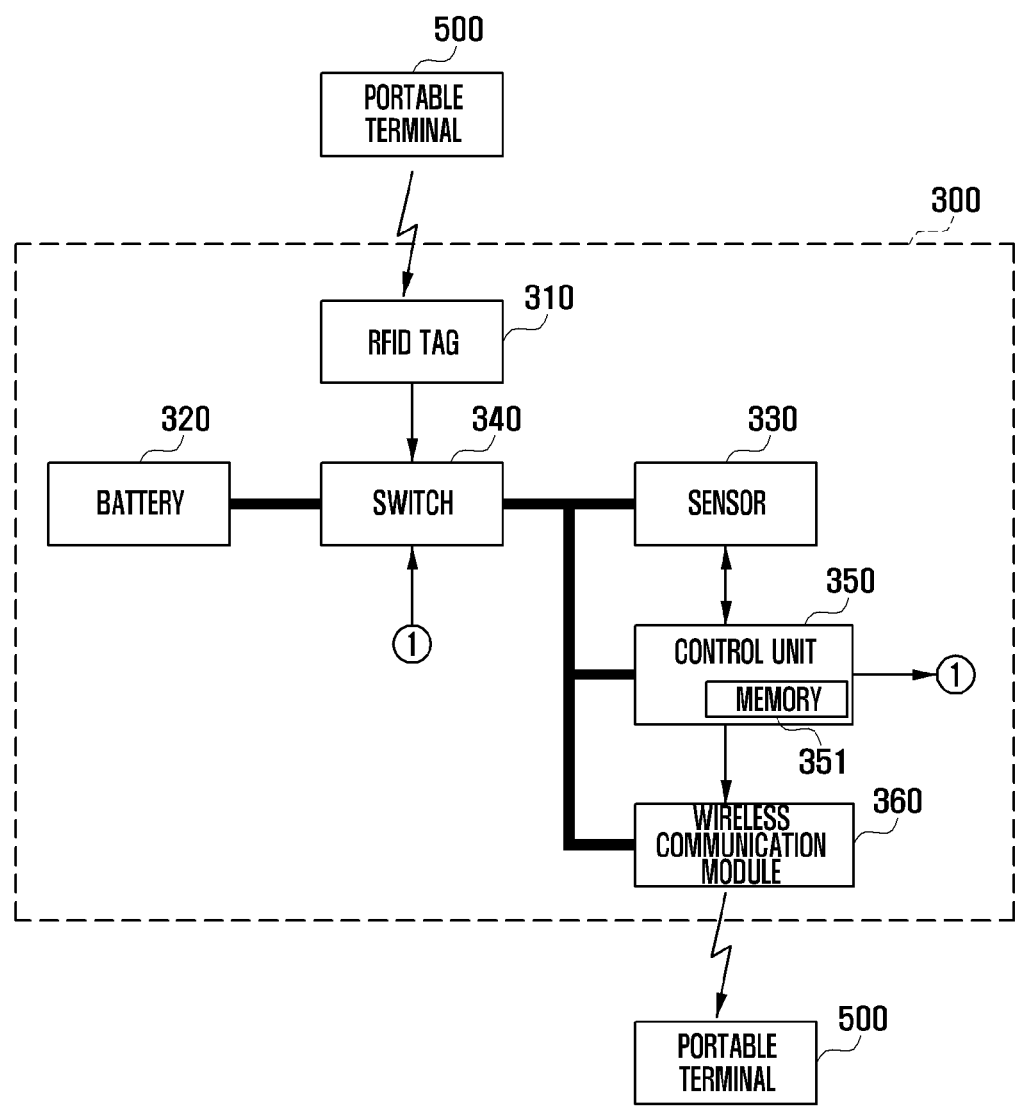
FIG. 6 is a block diagram illustrating a configuration of a wireless communication apparatus according to an exemplary embodiment of the present invention.

FIG. 6 is a block diagram illustrating a configuration of a wireless communication apparatus according to an exemplary embodiment of the present invention.

Referring to FIG. 6, a wireless communication apparatus 300 according to an exemplary embodiment of the present invention may include an RFID tag 310, a battery 320, a sensor 330, a switch 340, a control unit 350, and a wireless communication module 360. Here, the switch 340, the control unit 350, and the wireless communication module 360 may be configured by one IC chip.

The RFID tag 310 may be a semi-passive tag that operates according to energy received from a portable terminal 500. Further, the RFID tag 310 turns-on a switch 340 using energy of a wake up signal received from the portable terminal 500. That is, the RFID tag 310 in FIG. 6 also executes only a function for turning-on power of the wireless communication apparatus 200 similar to the RFID tag 210 described above.

The sensor 330, the switch 340, and the wireless communication module 360 are identical to the sensor 130, the switch 140, and the wireless communication module 160 described above, and thus a detailed description thereof is omitted.

If power from the battery 320 is supplied to the control unit 350 as the switch 340 is turned-on, the control unit 350 drives the sensor 130. The control unit 350 stores a physical amount received from the sensor 330 in the memory 351 thereof. The control unit 350 controls the wireless communication module 360 to transmit data stored in a memory 351 thereof to the portable terminal 500, and then turns-off the switch 340.

Figure 7:
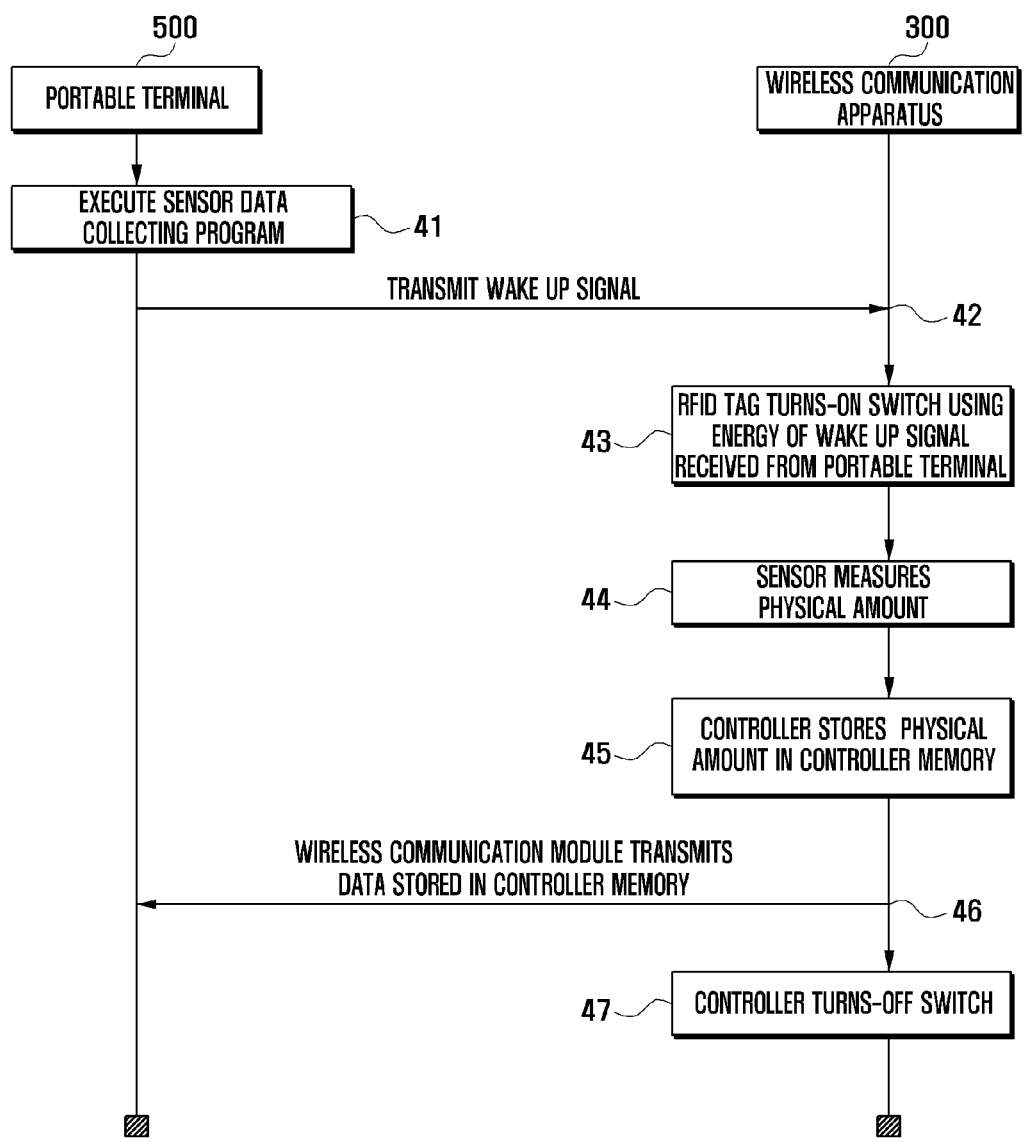
FIG. 7 is a diagram illustrating a low power driving method of a wireless communication apparatus according to an exemplary embodiment of the present invention.

FIG. 7 is a diagram illustrating an example of a low power driving method of a wireless communication apparatus according to an exemplary embodiment of the present invention.

Referring to FIG. 7, a portable terminal 500 executes a sensor data collecting program at step 41. Next, the portable terminal 500 transmits a wake up signal to an RFID tag 310 of a wireless communication apparatus 300 at step 42.

An RFID tag 310 turns-on a switch 340 using energy of a wake up signal received from the portable terminal 500 at step 43. As the switch 340 is turned-on, a sensor 130 measures a physical amount at step 44. A control unit 350 stores the physical amount received from the sensor 130 in a memory 351 thereof at step 45. When a wireless communication module 360 receives a command transmitting data from the control unit 350, it transmits data stored in a memory 351 of the control unit 350 to the portable terminal 500 at step 46. The control unit 350 turns-off the switch 340 at step 47.

Figure 8:
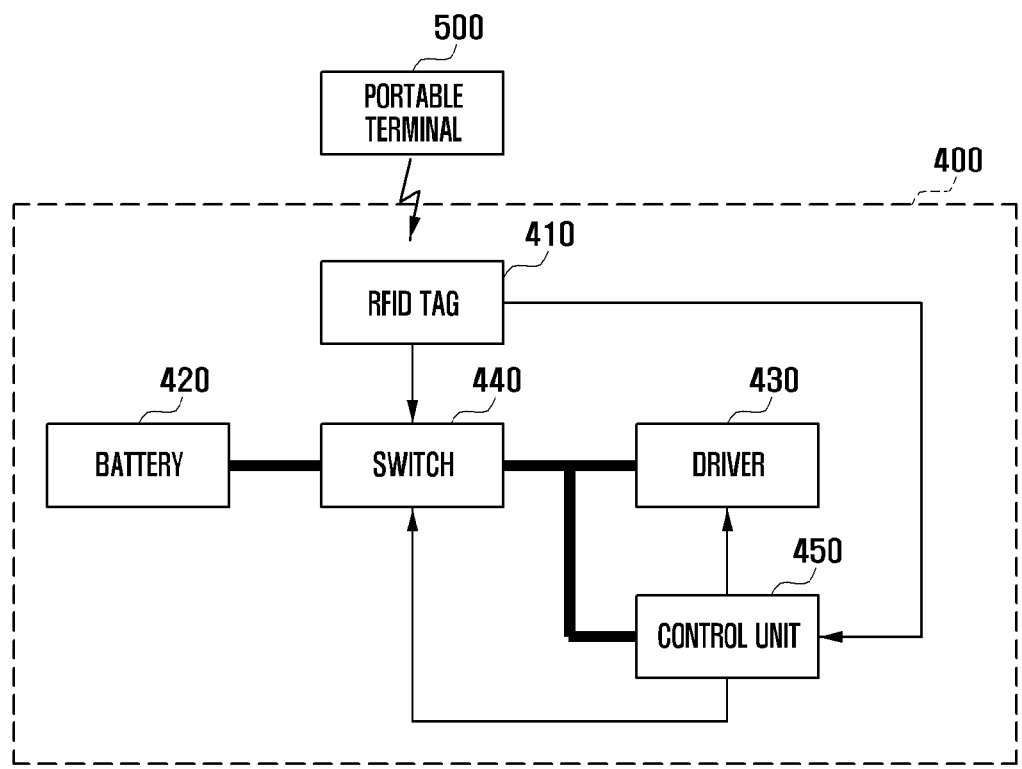
FIG. 8 is a block diagram illustrating a configuration of a wireless communication apparatus according to an exemplary embodiment of the present invention.

FIG. 8 is a block diagram illustrating a configuration of a wireless communication apparatus according to an exemplary embodiment of the present invention.

Referring to FIG. 8, a wireless communication apparatus 400 according to an exemplary embodiment of the present invention may include an RFID tag 410, a battery 420, a driver 430, a switch 440, and a control unit 450. Here, the switch 440 and the control unit 450 may be configured by one IC chip. Further, when the driver 430 is a unit performing an electrical operation, the driver 430, the switch 440, and the control unit 450 may be configured by one IC chip.

The RFID tag 410 in FIG. 8 is substantially identical with the RFID tag 110 described above, and thus a detailed description thereof is omitted. However, the RFID tag 410 does not execute a function of collecting and transmitting data from the control unit 450 to the portable terminal 500. Further, the RFID tag 410 does not need to receive power supplied from the battery 420 through the switch 440. In addition, a command described above is a command for controlling an operation of a sensor 130, whereas a command in FIG. 8 according to an exemplary embodiment of the present invention is a command for controlling an operation of the driver 430.

The driver 430 may be configured by a unit for performing an electrical or mechanical operation. For example, the driver 430 may include various types of switching devices such as a TeleVision (TV) on/off switch, a door lock device of a vehicle, a lamp on/off switch, and a temperature controller of an air conditioner changing an open/close state, or a connection state or level.

The switch 440 substantially has the same function as that of each of the switches described above, and thus a detailed description thereof is omitted.

The control unit 450 operates the driver 430 according to a command received from the RFID tag 410, and then turns-off the switch 440.

Although a wireless communication apparatus according to exemplary embodiments of the present invention have been described hereinabove, it should be clearly understood that many variations and modifications of the basic inventive concepts herein taught which may appear to those skilled in the present art will still fall within the spirit and scope of the present invention, as defined in the appended claims. For example, the wireless communication apparatus of the present invention is applicable to a plurality of sensor nodes in a wireless sensor network composed of the sensor nodes and a sink node collecting and sending physical amounts from the sensor nodes to an external network.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A wireless communication apparatus for starting an operation according to an electric wave received from a portable terminal, the wireless communication apparatus comprising:
   a battery;
   a sensor configured to measure a physical amount;
   a wireless communication module configured to transmit data to the portable terminal;
   a switch;
   a Radio Frequency Identification (RFID) tag configured to turn on the switch using the electric wave received from the portable terminal; and
   a control unit electronically connected to the sensor, the wireless communication module, the RFID tag and the switch,
   wherein power of the battery is supplied to the sensor, the wireless communication module and the control unit when the switch is turned on,
   wherein the supply of the power of the battery to the sensor, the wireless communication module and the control unit is cut off when the switch is turned off, and
   wherein the control unit is configured to:
      when the switch is turned on, drive the sensor to measure a physical amount, store the physical amount received from the sensor and turn off the switch, and
      when the switch is turned on after storing the received physical amount, control the wireless communication module to transmit the stored physical amount to the portable terminal and turn off the switch.

2. The wireless communication apparatus of claim 1, further comprising a counter configured to turn on the switch at preset times, wherein the control unit comprises a memory for storing the received physical amount.

3. The wireless communication apparatus of claim 2,
   wherein, when the switch is turned on by the counter, the sensor is configured to measure a physical amount and the control unit is configured to store a physical amount received from the sensor in the memory, and
   wherein, when the switch is turned on the RFID tag, the wireless communication module is configured to transmit a physical amount stored in the memory to the portable terminal.

4. The wireless communication apparatus of claim 3, wherein the wireless communication module is configured to communicate with the portable terminal using at least one of Bluetooth technology, a Wireless Local Area Network (WLAN) and Ultra-WideBand (UWB) technology.

5. A wireless communication apparatus for starting an operation according to an electric wave received from a portable terminal, the wireless communication apparatus comprising:
   a battery;
   a sensor configured to measure a physical amount;
   a switch;
   a Radio Frequency Identification (RFID) tag configured to turn on the switch using the electric wave received from the portable terminal; and
   a control unit electronically connected to the sensor, the switch and the RFID tag,
   wherein power of the battery is supplied to the sensor and the control unit when the switch is turned on,
   wherein the supply of the power of the battery to the sensor and the control unit is cut off when the switch is turned off; and
   wherein the control unit is configured to:
      when the switch is turned on, drive the sensor to measure a physical amount, store the physical amount received from the sensor and turn off the switch, and
      when the switch is turned on after storing the received physical amount, control to transmit the stored physical amount to the portable terminal and turn off the switch.

6. The wireless communication apparatus of claim 5,
   wherein the control unit is further configured to:
      store the received physical amount in a tag memory of the RFID tag, and
      turn off the switch, and
   wherein the RFID tag is further configured to transmit the physical amount stored in the tag memory to the portable terminal using energy of a data request signal received from the portable terminal.

7. The wireless communication apparatus of claim 6, further comprising a wireless communication module configured to:
   receive the power of the battery through the switch, and
   transmit the received physical amount to the portable terminal when the wireless communication module receives a data transmission command signal from the control unit.

8. The wireless communication apparatus of claim 7,
   wherein the control unit is further configured to:
      store the received physical amount in the tag memory of the RFID tag when a size of the received physical amount is less than a threshold value, and
      turn off the switch, and
   wherein the control unit is further configured to:
      control the wireless communication module to transmit the received physical amount to the portable terminal when the size of the received physical amount is equal to or greater than the threshold value, and
      turn off the switch.

9. The wireless communication apparatus of claim 8, wherein the wireless communication module is configured to communicate with the portable terminal using at least one of Bluetooth technology, a Wireless Local Area Network (WLAN), and Ultra-WideBand (UWB) technology.

10. The wireless communication apparatus of claim 5, further comprising:
    a wireless communication module configured to:
       receive the power of the battery through the switch, and
       transmit the received physical amount to the portable terminal when the wireless communication module receives a data transmission command signal from the control unit; and a counter configured to turn on the switch at preset times, wherein, when the switch is turned on by the counter, the sensor is further configured to measure the physical amount and the control unit is further configured to store the physical amount received from the sensor in the memory, and wherein, when the switch is turned on by the RFID tag, the wireless communication module is further configured to transmit the physical amount stored in the memory to the portable terminal.

\* \* \* \* \*